United States Patent
Hwang et al.

(10) Patent No.: US 6,867,912 B2
(45) Date of Patent: Mar. 15, 2005

(54) WIDE-BAND ERBIUM-DOPED FIBER AMPLIFIER AND WAVELENGTH DIVISION MULTIPLEXING OPTICAL TRANSMISSION SYSTEM

(75) Inventors: Seong-Taek Hwang, Pyongtaek-shi (KR); Young-Hoon Joo, Yongin-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 10/279,528

(22) Filed: Oct. 24, 2002

(65) Prior Publication Data

US 2004/0075891 A1 Apr. 22, 2004

(30) Foreign Application Priority Data

Mar. 19, 2002 (KR) .......................................... 2002-14651

(51) Int. Cl.[7] ................................................ H01S 3/00
(52) U.S. Cl. ..................................... 359/349; 359/341.1
(58) Field of Search ............................. 359/349, 341.1

(56) References Cited

U.S. PATENT DOCUMENTS 6,304,370 B1 * 10/2001 Barnard ................... 359/341.1
6,532,104 B1 * 3/2003 Bayart ....................... 359/337.4
6,535,331 B2 * 3/2003 Shiota et al. ............ 359/341.32
6,646,796 B2 * 11/2003 Song et al. ................... 359/349
6,674,570 B2 * 1/2004 Song et al. ................... 359/349

* cited by examiner

Primary Examiner—Mark Hellner
(74) Attorney, Agent, or Firm—Cha & Reiter, L.L.C.

(57) ABSTRACT

An erbium-doped fiber amplifier and a wavelength division multiplexing optical transmission system equipped with the same are disclosed. The wavelength division multiplexing optical transmission system includes a transmission stage having a first C/L fiber amplifier for amplifying combined C and L-band optical signals, an optical repeater having at least one second C/L fiber amplifier for amplifying the optical signals transmitted from a single mode fiber of a predetermined length, and a dispersion compensating fiber of a predetermined length for compensating dispersions of the amplified optical signals. The system also includes a reception stage having a third C/L fiber amplifier for amplifying the optical signals transmitted from a single mode fiber of a predetermined length, and a receiver for separating the amplified optical signals from the third C/L fiber amplifier into C-band optical signals and L-band optical signals band by band and de-multiplexing the separated amplified optical signals.

8 Claims, 4 Drawing Sheets

FIG.1 [PRIOR ART]

WIDE-BAND ERBIUM-DOPED FIBER AMPLIFIER AND WAVELENGTH DIVISION MULTIPLEXING OPTICAL TRANSMISSION SYSTEM

CLAIM OF PRIORITY

This application claims priority to an application entitled "WIDE-BAND ERBIUM-DOPED FIBER AMPLIFIER AND WAVELENGTH DIVISION MULTIPLEXING OPTICAL TRANSMISSION SYSTEM EQUIPPED WITH THE SAME", filed in the Korean Industrial Property Office on Mar. 19, 2002 and assigned Ser. No. 2002-14651, the contents of which are hereby incorporated by reference.

BACKGROUND OF THE INVENTION

1. Field of the Invention

The present invention relates to an erbium-doped fiber amplifier and a wavelength division multiplexing optical transmission system equipped with the same, and more particularly to a cost-effective, wide-band, erbium-doped fiber amplifier and a wavelength division multiplexing optical transmission system equipped with the same.

2. Description of the Related Art

A conventional WDM (Wavelength Division Multiplexing) optical transmission system transmits optical signals of several wavelengths using one optical fiber. This allows for the efficient of transmission and transmitting the optical signals regardless of the transmission speed. WDM optical transmission systems are very useful for high-speed Internet networks that require large amounts of data to be transmitted. In order to meet of the high data transmission rate, the WDM optical transmission systems must have an expanded transmission bandwidth range. In this regard, a number of active research efforts are being made in conjunction with wide-band transmission systems for using both a C-band (Conventional band) and an L-band (Long band).

FIG. 1 shows a configuration of a conventional optical transmission system based on a 160 km SMF (Single Mode Fiber) using 80 channels with 10 Gbps capacity. As shown in FIG. 1, 40-channel optical signals for the C-band are modulated by a 10 Gbps modulator 111. The modulated signal is then dispersion-compensated by a DCF (Dispersion Compensated Fiber) 113. A C-band EDFA (Erbium-Doped Fiber Amplifier) 115 is used to amply the dispersion-compensated C-band optical signals. Forty-channel optical signals for the L-band are modulated by a 10 Gbps modulator 112. The modulated signal is then dispersion-compensated by a DCF 114. An L-band EDFA 116 is used to amply the dispersion-compensated L-band optical signals. The C-band optical signals have a wavelength in the range of 1530 nm–1560 nm, and the L-band optical signals have a wavelength in the range of 1570 nm–1610 nm.

In a transmission stage 110, the amplified C and L-band optical signals are combined to be transmitted within one optical fiber. The combined C and L-band optical signals are output from the transmission stage 110 and pass through an 80 km SMF 118. The combined C and L-band optical signals are then transmitted to an optical repeater 120. The optical repeater 120 separates the combined C and L-band optical signals into the C-band optical signals and the L-band optical signals band by band. The separated C-band optical signals from the optical repeater 120 are amplified by a second C-band EDFA 121 and then dispersion-compensated by a DCF 123. A third C-band EDFA 125 amplifies the dispersion-compensated C-band optical signals from the DCF 123.

The separated L-band optical signals from the optical repeater 120 are amplified by a second L-band EDFA 122 and then dispersion-compensated by a DCF 124 having a predetermined length. A third L-band EDFA 126 amplifies the dispersion-compensated L-band optical signals from the DCF 124. The amplified dispersion-compensated C and L-band optical signals are combined within one optical fiber, pass through the 80 km SMF 128, and reach a reception stage 130.

In the reception stage 130, the combined C and L-band optical signals are separated into the C-band optical signals and the L-band optical signals band by band. The separated C-band optical signals are amplified by a fourth C-band EDFA 132 and then de-multiplexed. The separated L-band optical signals are amplified by a fourth L-band EDFA 134 and then de-multiplexed.

As described above, the conventional optical transmission system needs to repeatedly perform the steps of separating combined C and L-band optical signals, dispersion-compensation, and amplification, respectively, in each of a transmission stage, e.g., in the optical repeater 120 and the reception stage 130. This is a significant shortcoming of conventional optical transmission systems because the number of optical devices such as amplifiers or dispersion compensating fibers is doubled and therefore the cost required for manufacturing the system increases.

Accordingly there is a need in the art for improved optical transmission systems that provide cost-effective solutions to this shortcoming of conventional optical transmission systems.

SUMMARY OF THE INVENTION

Therefore, the present invention has been made in view of the above problems.

One object of the present invention is to provide a wide-band erbium-doped fiber amplifier and a wavelength division multiplexing optical transmission system equipped with the same, which can be manufactured at reduced cost.

In accordance with one aspect of the present invention, the above and other objects can be accomplished by the provision of a wide-band erbium-doped fiber amplifier, including a first optical fiber amplifier for amplifying input C-band (Conventional band) optical signals, a second optical fiber amplifier connected to a downstream end of the first optical fiber amplifier in series for amplifying input L-band (Long band) optical signals, and a C/L splitter arranged between the first and second optical fiber amplifiers for splitting the amplified C and L-band optical signals to transmit them toward different paths. The system also includes a gain flattening filter for flattening gains of the amplified C-band optical signals split by the C/L splitter, an optical reflector arranged downstream from the first optical fiber amplifier for backward-reflecting the amplified L-band optical signals to the second optical fiber amplifier, a circulator for circulating the amplified L-band optical signals backward-reflected from the optical reflector to another path, and a C/L combiner for combing and outputting the amplified C-band optical signals split and gain-flattened by the C/L splitter and the gain flattening filter and the amplified L-band optical signals circulated to another path by the circulator.

In accordance with another aspect of the present invention, a WDM (Wavelength Division Multiplexing)

optical transmission system is provided that includes a transmission stage having a first C/L fiber amplifier for amplifying combined C and L-band optical signals, an optical repeater having at least one second C/L fiber amplifier for amplifying the optical signals transmitted from a single mode fiber of a predetermined length, and a dispersion compensating fiber of a predetermined length for compensating dispersions of the amplified optical signals. The system include a reception stage having a third C/L fiber amplifier for amplifying the optical signals transmitted from a single mode fiber of a predetermined length, and a receiver for separating the amplified optical signals from the third C/L fiber amplifier into C-band optical signals and L-band optical signals band by band and de-multiplexing the separated amplified optical signals.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the following description, a detailed description of known functions, elements, devices and configurations incorporated herein will be omitted when it may make the subject matter of the present invention rather unclear.

Figure 1:
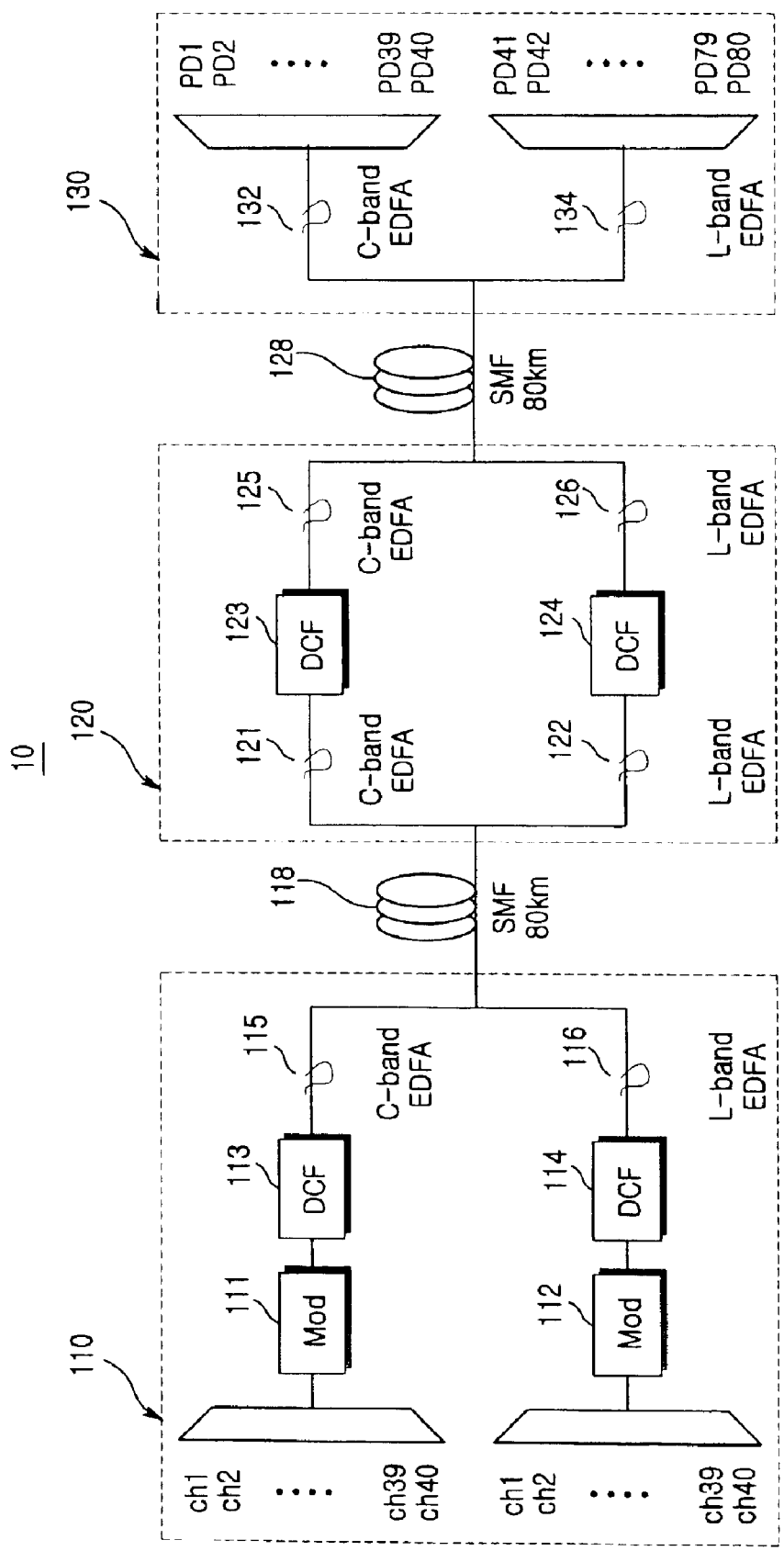
FIG. 1 is a view illustrating a configuration of a conventional wavelength division multiplexing optical transmission system.
Figure 2:
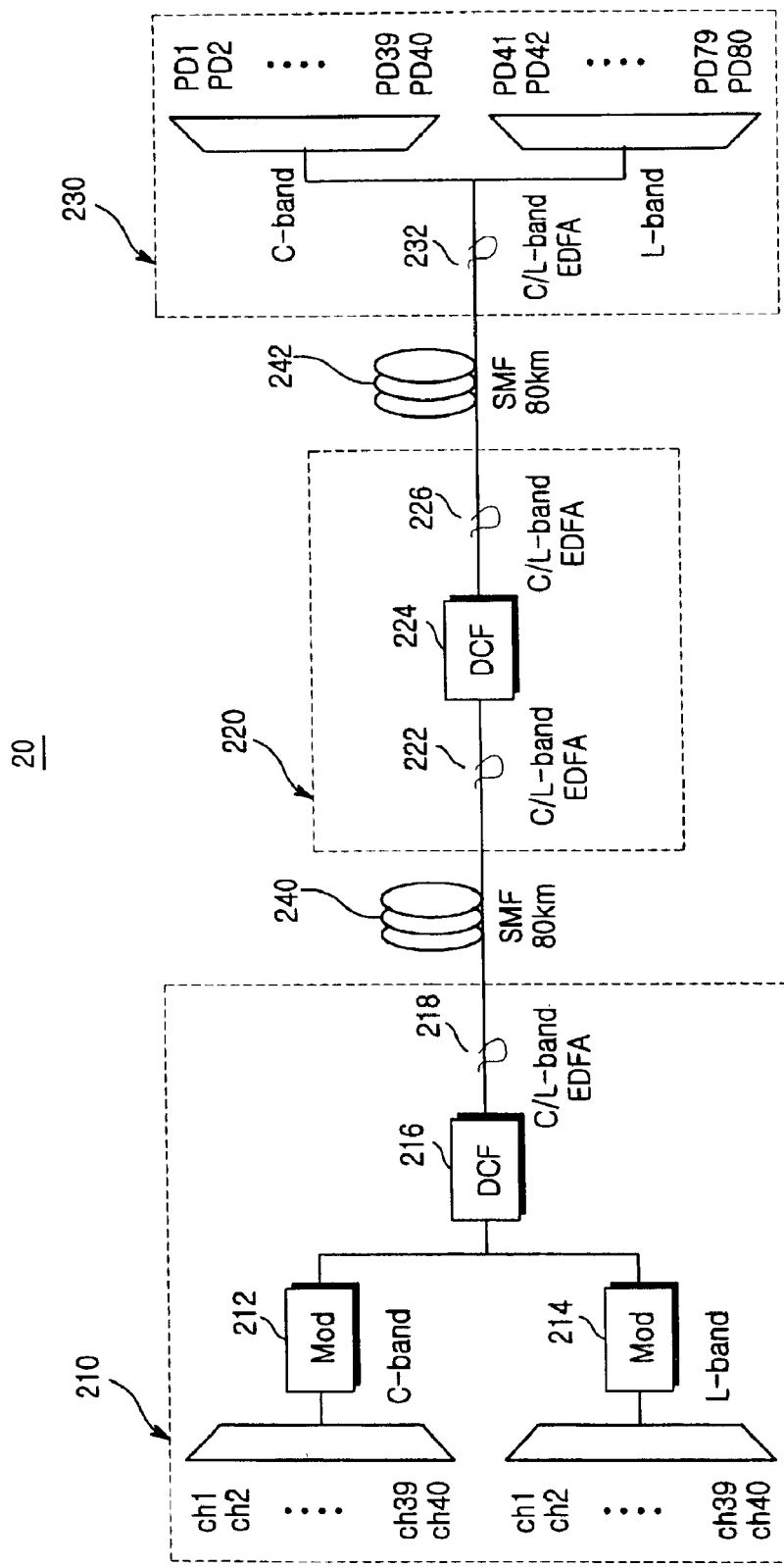
FIG. 2 is a view illustrating a configuration of a wavelength division multiplexing optical transmission system in accordance with an embodiment of the present invention.

FIG. 2 is a view illustrating a configuration of a WDM (Wavelength Division Multiplexing) optical transmission system 20 in accordance with an embodiment of the present invention. As shown in FIG. 2, the WDM optical transmission system 20 includes a transmission stage 210, an optical repeater 220 and a reception stage 230. The transmission stage 210 has a first C/L (Conventional/Long)-band EDFA (Erbium-Doped Fiber Amplifier) 218 for amplifying combined C-band and L-band optical signals. The optical repeater 220 has second C/L-band EDFAs 222 and 226 coupled to a downstream end of the first C/L-band EDFA 218 in series for amplifying the optical signals and a second DCF (Dispersion Compensating Fiber) 224 for compensating dispersions of the amplified optical signals. The reception stage 230 has a third C/L-band EDFA 232 coupled to a downstream end of the second C/L-band EDFAs 222 and 226 in series for amplifying the optical signals.

In more detail, a 10 Gbps modulator 212 modulates and outputs 40-channel signals for a C-band, and a 10 Gbps modulator 214 modulates and outputs 40-channel signals for an L-band. The C and L-band optical signals are then combined. The first C/L-band EDFA 218 first amplifies the combined C-band and L-band signals. In this regard, the first C/L-band EDFA 218 acts to amplify both the C and L-band optical signals. A first DCF 216 having a predetermined length is connected to an upstream end of the first C/L-band EDFA 218. The first DCF 216 compensates dispersions of the combined C and L-band optical signals. The amplified, dispersion-compensated, optical signals pass through an 80 km SMF (Single Mode Fiber) 240 and are transmitted to the optical repeater 220.

The optical repeater 220 includes one or more EDFAs (e.g., 222 and 226) to amplify the optical signals weakened during transmission through the SMF 240. As shown in FIG. 2, the EDFAs included in the optical repeater 220 are the C/L-band EDFA 222 and the C/L-band EDFA 226 coupled to a downstream end of the C/L-band EDFA 222 in series. The C/L-band EDFAs 222 and 226 amplify the optical signals passing through the SMF 240 twice. The second DCF 224 having a predetermined length is preferably arranged between the C/L-band EDFAs 222 and 226 to compensate dispersions of the amplified optical signals.

The amplified dispersion-compensated optical signals are transmitted to the reception stage 230 via a second 80 km SMF 242. A third C/L-band EDPA 232 included in the reception stage 230 amplifies the optical signals transmitted through the second 80 km SMF 242. In the reception stage 230, the amplified optical signals from the third C/L-band EDFA 232 are separated into the C-band optical signals and the L-band optical signals band by band and then demultiplexed to be transmitted to each receiver.

Figure 3:
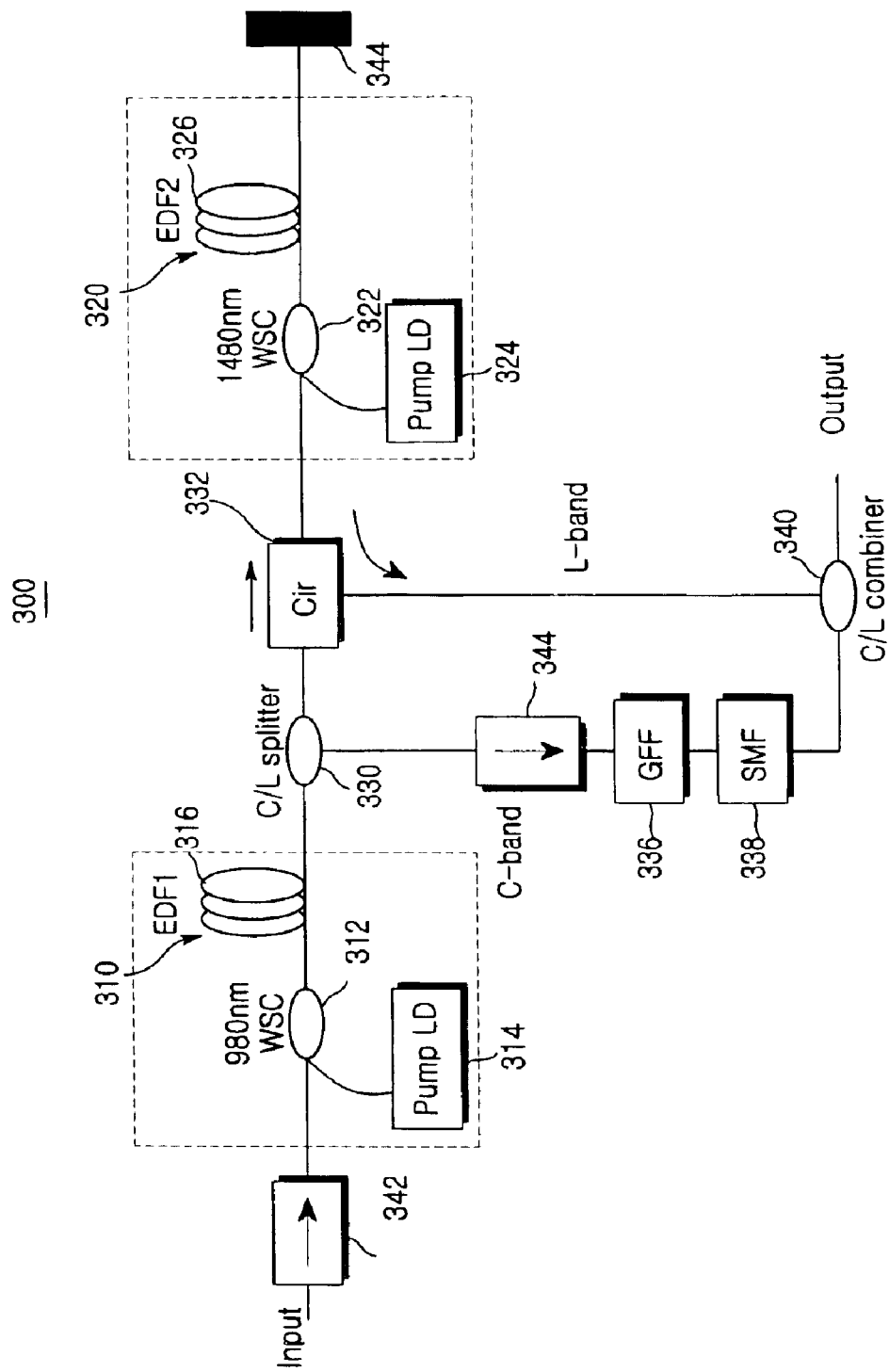
FIG. 3 is a view illustrating a configuration of a wide-band erbium-doped fiber amplifier adapted in the wavelength division multiplexing optical transmission system in accordance with an embodiment of the present invention.

Configurations of first, second and third C/L-band EDPAs adapted in the optical transmission system will be described with reference to FIG. 3. It should be understood that the first, second and third C/L-band EDFAs include the same or similar components. As shown in FIG. 3, a wide-band EDFA (hereinafter, referred to as an optical fiber amplifier) 300 adapted in the optical transmission system in accordance with the embodiment of the present invention includes first and second optical fiber amplifiers 310 and 320. The first optical fiber amplifier 310 includes a first EDF (Erbium-Doped Fiber) (EDF1) 316 for amplifying input optical signals coupled to pumping light from a first pump LD (Laser Diode) 314 by a 980 nm WSC (Wavelength Selective Coupler) 312. The second optical fiber amplifier 320 includes a second EDF (EDF2) 326 for amplifying input optical signals coupled to pumping light from a second pump LD 324 by a 1480 nm WSC 322. Those skilled in the art will appreciate that a laser diode is employed as a pumping light source.

In more detail, the optical fiber amplifier 300 in accordance with a first embodiment of the present invention includes the first EDF (EDF1) 316 having a predetermined length for amplifying the input optical signals coupled to 980 nm pumping light from the first pump LD 314 by the 980 nm WSC 312, and the second EDF (EDF2) 326 having a predetermined length for amplifying the input optical signals coupled to 1480 nm pumping light from the second pump LD 324 by the 1480 nm WSC 322. The above described "wide-band" means a combination of the C-band bandwidth and the L-band bandwidth.

The configuration of the optical fiber amplifier 300 will now be described in more detail. In the optical fiber amplifier 300, the first EDF (EDF1) 316 amplifies the C-band optical signals. The second EDF (EDF2) 326 coupled to the downstream end of the first EDF (EDF1) 316 in series amplifies the L-band optical signals. A C/L splitter 330 arranged between the first EDF (EDF1) 316 and the second EDF (EDF2) 326 splits input optical signals into C-band optical signals and L-band optical signals band by band. A circulator 332 circulates reflected amplified L-band optical signals to another path. A fiber reflector 334 backward transmits generated ASE (Amplified Spontaneous Emission) and the amplified L-band optical signals. A C/L combiner 340 combines the amplified C-band optical signals transmitted from the C/L splitter 330 and the amplified L-band optical signals transmitted from the circulator 332 to provide wide-band optical signals. A GFF (Gain Flattening Fiber) 336 is arranged between the C/L splitter 330 and the C/L combiner 340.

The optical fiber amplifier 300 forward transmits the resulting optical signals. The optical fiber amplifier 300 includes a first optical isolator 342 to cut off backward transmitting of the ASE generated during amplification of the optical signals. The circulator 332 further functions to prevent the ASE generated after amplifying the optical signals in the second optical fiber amplifier 320 from being backward-transmitted to the first optical fiber amplifier 310. A second optical isolator 344 is arranged within the optical fiber amplifier 300 so that the amplified C-band optical signals split by the C/L splitter 330 can be backward transmitted.

Preferably, the GFF 336 is arranged between the second optical isolator 344 and the C/L combiner 340 to flatten gains of the amplified C-band optical signals. The SMF 338 is arranged between the GFF 336 and the C/L combiner 340.

In general, a typical SMF has a color dispersion value of +17 ps/nm/km for a C-band and slightly different color dispersion values for an L-band. A typical 80 km SMF has a dispersion value of +1340 ps/nm for 1550 nm optical signals and a dispersion value of +1520 ps/nm for 1590 nm optical signals. The dispersion compensating fiber adapted in the optical transmission system has a dispersion value of −1520 ps/nm appropriate to compensate dispersions of the L-band optical signals. The SMF 338 having a predetermined length is connected to a downstream end of the GFF 336 included in the optical fiber amplifier so that a dispersion value of a C-band optical signal equals to that of an L-band optical signal.

The C/L splitter 330 has three ports. One of the three ports is an input port for receiving the C-band optical signals amplified by the first optical fiber amplifier 310 and the L-band optical signals. A second port is an output port for outputting split C-band optical signals to direct them to another path different from a path for L-band optical signals. A third port is an output port for outputting the L-band optical signals except for the C-band optical signals among input optical signals.

The circulator 332 also has three ports. One of the three ports is an input terminal for receiving input optical signals. A second port is an output port for outputting the input optical signals or an input port for receiving backward-reflected amplified L-band optical signals. A third port is an output port for outputting the amplified L-band optical signals backward-reflected from the fiber reflector 334 to the C/L combiner 340 so that the backward-transmitted amplified L-band optical signals can be combined with the amplified C-band optical signals. The C-band optical signals have a wavelength in the range of 1530 nm–1560 nm and the L-band optical signals have a wavelength in the range of 1570 nm–1610 nm.

The operation of the optical fiber amplifier 300 having the above-described components will now be described.

In the optical fiber amplifier 300, the first EDF 316 amplifies C-band optical signals and the second EDF 326 amplifies L-band optical signals in forward and backward directions. The first EDF 316 uses the 980 nm pump LD 314 in the forward direction and the second EDF 326 uses the 1480 nm pump LD 324 in the forward direction. Alternatively, the 980 nm pump LD 314 and the 1480 nm pump LD 324 can be adapted in the backward direction or the both directions.

The first EDF 316 amplifies the optical signals coupled to 980 nm pumping light from the first pump LD 314 by the 980 nm WSC 312. As shown in FIG. 3, the first EDF 316 is configured to amply the C-band optical signals coupled to the pumping light in the forward direction.

The C/L splitter 330 splits the amplified optical signals into the C-band optical signals and the L-band optical signals band by band. The split amplified L-band optical signals are applied to the second EDF 326, while the split amplified C-band optical signals are transmitted to the C/L combiner 340. The L-band optical signals passing through the C/L splitter 330 are amplified by the second EDF 326.

The L-band optical signals amplified by the second EDF 326 are reflected by the optical reflector 334 and backward reflected to the second EDF 326. The second EDF 326 re-amplifies the L-band optical signals backward reflected from the optical reflector 334. The L-band optical signals amplified by the second EDF 326 are totally reflected from the optical reflector 334.

Preferably, the 980 nm pump LD 314 used as the pumping light source for the first EDF 316 is used to lower an amplification noise figure. The 1480 nm pump LD 324 used as the pumping light source for the second EDF 326 is used for higher power amplification. Preferably, the circulator 332 prevents the ASE generated after amplification by the second EDF 326 from being backward transmitted to the first EDF 316. In this regard, the circulator 332 prevents the efficiency of the amplification from being lowered. The L-band optical signals passing through the second EDF 326 have an effect as passing through the second EDF 326 twice owing to the reflection. Here, although an EDF shorter than a typical L-band EDF is employed, this allows for sufficient amplification gain to be obtained.

The GFF 336 flattens the amplified C-band optical signals split by the C/L splitter 330 and dispersion values of the C-band optical signals are allowed to equal to these of the L-band optical signals during passing through the SMF 338.

Figure 4:
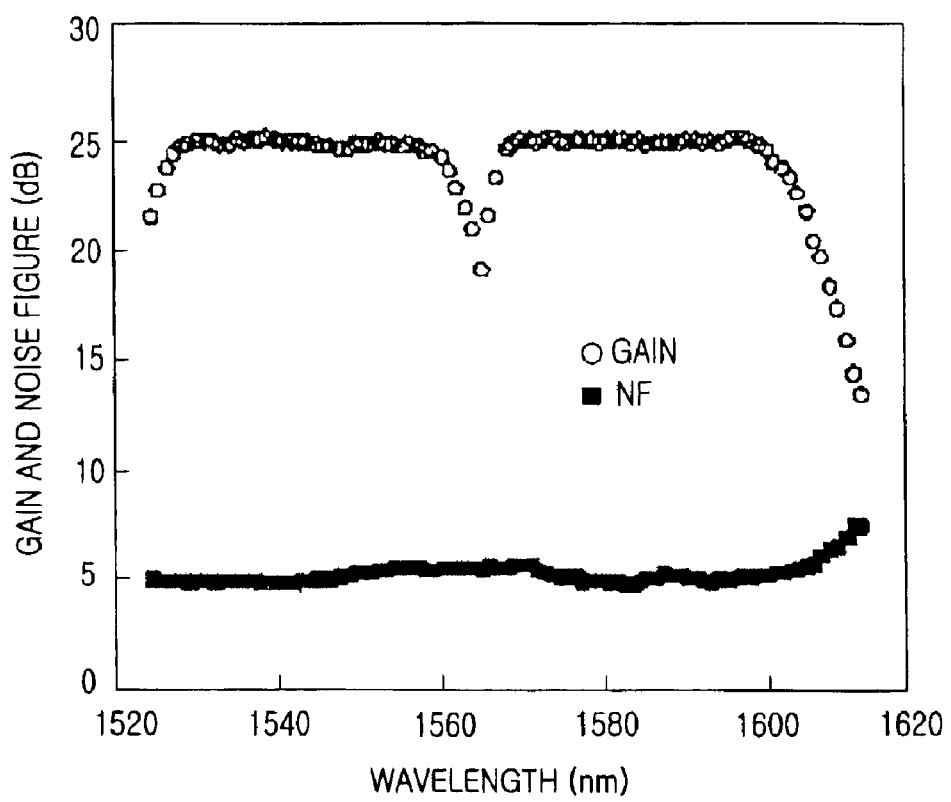
FIG. 4 is a graph illustrating characteristics of the wide-band erbium-doped fiber amplifier in accordance with an embodiment of the present invention.

As shown in FIG. 4, the EDFA in accordance with the present invention has a substantially identical gain (denoted as GAIN) and noise figure (denoted as NF) for wavelengths in the C and L-bands.

Although the preferred embodiments of the present invention have been disclosed for illustrative purposes, those skilled in the art will appreciate that various modifications, additions and substitutions are possible, without departing from the scope of the invention.

As apparent from the above description, the present invention enables to implement an optical transmission system adapting an erbium-doped fiber with a flattened amplification gain, thereby reducing cost of manufacture for the optical transmission system.

What is claimed is:

1. A wide-band erbium-doped fiber amplifier, comprising:
   a first optical fiber amplifier for amplifying input C-band (Conventional band) optical signals;
   a second optical fiber amplifier connected to a downstream end of the first optical fiber amplifier in series for amplifying input L-band (Long band) optical signals;

a C/L splitter arranged between the first and second optical fiber amplifiers for splitting the amplified C and L-band optical signals;

a gain flattening filter for flattening gains of the amplified C-band optical signals split by the C/L splitter;

an optical reflector arranged downstream from the first optical fiber amplifier for backward-reflecting the amplified L-band optical signals split by the C/L splitter to the second optical fiber amplifier;

a circulator for circulating the amplified L-band optical signals backward-reflected from the optical reflector; and a C/L combiner for combing and outputting the amplified C-band optical signals split by the C/L splitter and gain-flattened by the gain flattening filter and the amplified L-band optical signals circulated by the circulator.

2. The wide-band erbium-doped fiber amplifier according to claim 1, wherein the first optical fiber amplifier includes a first erbium-doped fiber coupled to a 980 nm pump laser diode through a 980 nm wavelength selective coupler for receiving pumping light, and the second optical fiber amplifier includes a second erbium-doped fiber coupled to a 1480 nm pump laser diode through a 1480 nm wavelength selective coupler for receiving pumping light, and the circulator cuts off backward transmitting of ASE (Amplified Spontaneous Emission) generated when the second optical fiber amplifier amplifies the optical signals, and the wide-band erbium-doped fiber amplifier further comprises:

a first optical isolator arranged between the C/L splitter and the C/L combiner; and a second optical isolator for preventing backward transmitting of the amplified C and L-band optical signals split by the C/L splitter.

3. The wide-band erbium-doped fiber amplifier according to claim 1, wherein the gain-flattening filter is arranged between the C/L splitter and the C/L combiner.

4. The wide-band erbium-doped fiber amplifier according to claim 1, further comprising:

a single mode fiber arranged between the gain-flattening filter and the C/L combiner for adjusting dispersion-compensation for the optical signals.

5. A WDM (Wavelength Division Multiplexing) optical transmission system, comprising:

a transmission stage having a first C/L fiber amplifier for amplifying combined C and L-band optical signals;

an optical repeater having at least one second C/L fiber amplifier for amplifying the optical signals transmitted from a first single mode fiber of a predetermined length, and a dispersion compensating fiber of a predetermined length for compensating dispersions of the amplified optical signals; and a reception stage having a third C/L fiber amplifier for amplifying the optical signals transmitted from a second single mode fiber of a predetermined length, and a receiver for separating the amplified optical signals from the third C/L fiber amplifier into C-band optical signals and L-band optical signals band by band and de-multiplexing the separated amplified optical signals.

6. The WDM optical transmission system according to claim 5, wherein the transmission stage includes a dispersion compensating fiber arranged upstream from the first C/L fiber amplifier for compensating dispersions of the combined C and L-band optical signals.

7. The WDM optical transmission system according to claim 5, wherein the second C/L fiber amplifier includes two C/L erbium-doped fiber amplifiers in which one C/L erbium-doped fiber amplifier is connected to a downstream end of the other C/L erbium-doped fiber amplifier in series.

8. The WDM optical transmission system according to claim 7, wherein a second dispersion compensating fiber is arranged between the two C/L erbium-doped fiber amplifiers.

* * * * *